United States Patent
Wakui (10) Patent No.: US 10,659,694 B2
(45) Date of Patent: May 19, 2020

(54) IMAGING DEVICE, IMAGING METHOD AND IMAGING DEVICE CONTROL PROGRAM

(71) Applicant: FUJIFILM Corporation, Tokyo (JP)

(72) Inventor: Takashi Wakui, Ashigarakami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 16/177,574

(22) Filed: Nov. 1, 2018

(65) Prior Publication Data
US 2019/0075242 A1   Mar. 7, 2019

Related U.S. Application Data

(63) Continuation of application No. PCT/JP2017/008465, filed on Mar. 3, 2017.

(30) Foreign Application Priority Data

May 9, 2016 (JP) ................................. 2016-093615

(51) Int. Cl.
| | |
|---|---|
| *H04N 5/232* | (2006.01) |
| *G02B 21/14* | (2006.01) |
| *G02B 21/36* | (2006.01) |
| *G02B 21/26* | (2006.01) |
| *G06T 5/00* | (2006.01) |

(Continued)

(52) U.S. Cl.
CPC ......... *H04N 5/23267* (2013.01); *G01N 21/01* (2013.01); *G01N 21/17* (2013.01);
(Continued)

(58) Field of Classification Search
CPC ............. G02B 21/367; H04N 5/23264; H04N 5/23267; H04N 5/2329; G06T 5/003; G06T 2207/10056; G06T 2207/20201
See application file for complete search history.

(56) References Cited

U.S. PATENT DOCUMENTS

| | | |
|---|---|---|
| 2004/0212808 A1 | 10/2004 | Okawa et al. |
| 2008/0249285 A1 | 10/2008 | Hermans et al. |
| | (Continued) | |

FOREIGN PATENT DOCUMENTS

| | | |
|---|---|---|
| EP | 1491932 A1 | 12/2004 |
| JP | 2004145302 A | 5/2004 |
| | (Continued) | |

OTHER PUBLICATIONS

Communication dated Jul. 19, 2019 from the Korean Intellectual Property Office in counterpart Application No. 10-2018-7032332.
(Continued)

*Primary Examiner* — Paul M Berardesca
(74) *Attorney, Agent, or Firm* — Sughrue Mion, PLLC (57) ABSTRACT

Provided are an imaging device that make it possible to perform high-speed image capture of an observation target such as a cell, and to correct a shake caused by the movement of a stage or the like appropriately and simply. The imaging device includes a stage on which a vessel having an observation target received therein is installed, an imaging optical system that forms an image of the observation target, a horizontal driving unit that moves the stage in a main scanning direction and a sub-scanning direction orthogonal to the main scanning direction, and moves the stage forward and backward in the main scanning direction, an imaging unit that receives the image formed by the imaging optical system, and outputs an image signal of the observation target, and a shake correction unit that performs shake correction for correcting a shake caused by movement of the stage on the image signal.

13 Claims, 8 Drawing Sheets

(51) Int. Cl.

| | |
|---|---|
| *H04N 5/225* | (2006.01) |
| *G03B 5/00* | (2006.01) |
| *G02B 27/64* | (2006.01) |
| *H04N 5/235* | (2006.01) |
| *G01N 21/41* | (2006.01) |
| *G01N 21/01* | (2006.01) |
| *G01N 21/17* | (2006.01) |

(52) U.S. Cl.
CPC ............. *G01N 21/41* (2013.01); *G02B 21/14* (2013.01); *G02B 21/26* (2013.01); *G02B 21/367* (2013.01); *G02B 27/646* (2013.01); *G03B 5/00* (2013.01); *G06T 5/003* (2013.01); *H04N 5/225* (2013.01); *H04N 5/232* (2013.01); *H04N 5/2329* (2013.01); *H04N 5/2354* (2013.01); *G06T 2207/10056* (2013.01); *G06T 2207/20201* (2013.01)

(56) References Cited

U.S. PATENT DOCUMENTS

| | | |
|---|---|---|
| 2009/0028544 A1 | 1/2009 | Ogihara |
| 2010/0321484 A1 | 12/2010 | Kishima |
| 2015/0241686 A1 | 8/2015 | Abe |
| 2016/0110852 A1* | 4/2016 | Yanai ...................... G06T 5/003 382/264 |

FOREIGN PATENT DOCUMENTS

| | | |
|---|---|---|
| JP | 2011-107669 A | 6/2011 |
| JP | 2014115609 A | 6/2014 |
| WO | 2014077001 A1 | 5/2014 |

OTHER PUBLICATIONS

International Preliminary Report on Patentability with English Translation of the Written Opinion of PCT/JP2017/008465 dated Nov. 13, 2018.

Written Opinion of PCT/JP2017/008465 dated Jun. 6, 2017.

International Search Report of PCT/JP2017/008465 dated Jun. 6, 2017.

Communication dated Apr. 2, 2019 from the Japanese Patent Office in application No. 2016-093615.

Communication dated Apr. 12, 2019 from the European Patent Office in application No. 17795803.0.

* cited by examiner

IMAGING DEVICE, IMAGING METHOD AND IMAGING DEVICE CONTROL PROGRAM

CROSS-REFERENCE TO RELATED APPLICATIONS

This application is a Continuation of PCT International Application No. PCT/JP2017/008465 filed on Mar. 3, 2017, which claims priority wider 35 U.S.C § 119(a) to Japanese Patent Application No. 2016-093615 filed on May 9, 2016. Each of the above application(s) is hereby expressly incorporated by reference, in its entirety, into the present application.

BACKGROUND OF THE INVENTION

1. Field of the Invention

The present invention relates to an imaging device, a imaging method and a non-transitory computer readable recording medium storing an imaging device control program for observing an image of the entire observation target by relatively moving a stage on which a vessel having an observation target received therein is installed and an imaging optical system that forms an image of an observation target.

2. Description of the Related Art

Hitherto, there is proposed a method of determining a differentiated state or the like of a cell by capturing an image of a multipotent stem cell such as an embryonic stem (ES) cell and an induced pluripotent stem (iPS) cell, a differentiation-induced cell, or the like using a microscope or the like, and capturing the feature of the image.

The multipotent stem cell such as an ES cell and an iPS cell has the capability of differentiating to cells of various tissues, and has attracted attention as can be applied to regenerative medical treatment, the development of drugs, the elucidation of diseases, and the like.

On the other hand, it is proposed to perform so-called tiling photography in which, in order to acquire a high-magnification wide-field image in a case where the image of a cell is captured using a microscope as described above, the range of a culture vessel such as, for example, a well plate is scanned in the observation region of an imaging optical system, images for each observation region are captured, and then the images for each observation region are bonded (see, for example, JP2011-107669A).

SUMMARY OF THE INVENTION

Here, in order to perform high-efficiency culture of a cell, an imaging device that performs image capture at high speed is required.

However, for example, in a case where an observation region is scanned by moving a stage on which a culture vessel is placed, high-speed image capture can be performed by moving the stage at high speed, but in a case where the exposure time of an imaging element that captures an image of an observation target is not appropriate, a shake occurs in the captured image. The capability to simply control the exposure time of an imaging element for short period of time makes it possible to suppress a shake of an image, but there is a limitation on control of the exposure time of an imaging element, and thus it is not possible to sufficiently suppress a shake.

In addition, it is also considered to perform shake correction by performing a filtering process on a captured image, but in a case where the tiling photography as described above is performed, an observation region may be scanned forward and backward. In such a case, modes of occurrence of a shake are different from each other in an image captured during forward scanning and an image captured during backward scanning. Therefore, the performing of the same shake correction on images for each observation region does not make it possible to appropriately correct a shake.

The present invention is contrived in view of the above problem, and an object thereof is to provide an imaging device, an imaging method and a non-transitory computer readable recording medium storing an imaging device control program that make it possible to perform high-speed image capture of an observation target such as a cell, and to correct a shake caused by the movement of a stage or the like appropriately and simply.

According to the present invention, there is provided an imaging device comprising: a stage on which a vessel having an observation target received therein is installed; an imaging optical system that forms an image of the observation target within the vessel; a horizontal driving unit that moves at least one of the stage or the imaging optical system in a main scanning direction and a sub-scanning direction orthogonal to the main scanning direction, and moves the at least one forward and backward in the main scanning direction; an imaging unit that receives the image formed by the imaging optical system, and outputs an image signal of the observation target; and a shake correction unit that performs shake correction for correcting a shake caused by movement of at least one of the stage or the imaging optical system on the image signal which is output from the imaging unit, in which the shake correction unit switches a correction filter used in the shake correction in accordance with a movement direction of at least one of the stage or the imaging optical system in the main scanning direction.

In addition, in the imaging device of the present invention, it is preferable that the correction filter is asymmetric about a pixel position of a correction target in a direction corresponding to the main scanning direction.

In addition, the imaging device of the present invention may further comprise a light source that intermittently emits illumination light to the observation target in accordance with a shutter timing of the imaging unit, in which the shake correction unit may perform the shake correction using the correction filter according to light-emission characteristics of the illumination light.

In addition, the imaging device of the present invention may further comprise a measurement unit that measures the light-emission characteristics of the illumination light emitted from the light source, in which the shake correction unit may update the correction filter on the basis of the light-emission characteristics measured by the measurement unit.

In addition, in the imaging device of the present invention, the shake correction unit may include a forward correction filter and a backward correction filter in the main scanning direction, and switch the forward correction filter and the backward correction filter in accordance with the movement direction of at least one of the stage or the imaging optical system in the main scanning direction.

In addition, in the imaging device of the present invention, the shake correction unit may use the correction filter by reversing the correction filter in a direction corresponding to the main scanning direction, in accordance with the movement direction of at least one of the stage or the imaging optical system in the main scanning direction.

In addition, in the imaging device of the present invention, it is preferable that the shake correction unit includes the correction filter according to imaging conditions.

In addition, in the imaging device of the present invention, it is preferable that the shake correction unit includes the correction filter according to a movement speed of at least one of the stage or the imaging optical system in the main scanning direction.

In addition, in the imaging device of the present invention, the imaging optical system may form an image for each observation region obtained by dividing a range including the observation target, the imaging unit may output an image signal for each of the observation regions, and the shake correction unit may acquire image signals of all observation regions which are set in advance, and then perform the shake correction on the image signal for each of the observation regions using a correction filter according to the movement direction, on the basis of information of the movement direction of at least one of the stage or the imaging optical system in the main scanning direction at a point in time when the image signal for each of the observation regions is captured.

In addition, the imaging device of the present invention may further comprise a shake correction intensity change acceptance unit that accepts a change in intensity of the shake correction, in which the shake correction unit may perform the shake correction on the basis of the changed intensity.

According to the present invention, there is provided an imaging method comprising: moving at least one of a stage on which a vessel having an observation target received therein is installed or an imaging optical system that forms an image of the observation target within the vessel in a main scanning direction and a sub-scanning direction orthogonal to the main scanning direction, and moving the at least one forward and backward in the main scanning direction; and acquiring an image signal of the observation target by an imaging unit receiving the image formed by the imaging optical system, in which shake correction for correcting a shake caused by movement of at least one of the stage or the imaging optical system is performed on the image signal which is output from the imaging unit, and a correction filter used in the shake correction is switched in accordance with a movement direction of the at least one in the main scanning direction.

According to the present invention, there is provided a non-transitory computer readable recording medium storing an imaging device control program causing a computer to execute: a procedure of moving at least one of a stage on which a vessel having an observation target received therein is installed or an imaging optical system that forms an image of the observation target within the vessel in a main scanning direction and a sub-scanning direction orthogonal to the main scanning direction, and moving the at least one forward and backward in the main scanning direction; and a procedure of acquiring an image signal of the observation target by an imaging unit receiving the image formed by the imaging optical system, in which the computer is caused to further execute a procedure of performing shake correction for correcting a shake caused by movement of at least one of the stage or the imaging optical system on the image signal which is output from the imaging unit, and switching a correction filter used in the shake correction in accordance with a movement direction of the at least one in the main scanning direction.

According to the imaging device, the imaging method and the non-transitory computer readable recording medium storing an imaging device control program of the present invention, at least one of a stage on which a vessel having an observation target received therein is installed or an imaging optical system that forms an image of the observation target within the vessel is moved in a main scanning direction and a sub-scanning direction orthogonal to the main scanning direction, the at least one is moved forward and backward in the main scanning direction, and an image signal of the observation target is acquired by an imaging unit receiving the image formed by the imaging optical system.

Shake correction for correcting a shake caused by movement of at least one of the stage or the imaging optical system is performed on the image signal which is Output from the imaging unit, and a correction filter used in the shake correction is switched in accordance with a movement direction of the at least one in the main scanning direction. In this manner, the shake correction is performed using the correction filter, and the correction filter is switched in accordance with the movement direction, whereby it is possible to perform high-speed image capture of an observation target such as a cell, and to correct a shake caused by the movement of a stage or the like appropriately and simply.

BRIEF DESCRIPTION OF THE DRAWINGS

FIG. 11 is a diagram illustrating a shutter timing of an imaging element corresponding to each observation region in a case where the white light source is continuously turned on.

FIG. 12 is a diagram illustrating an example of a correction filter in a case where the white light source is continuously turned on.

DESCRIPTION OF THE PREFERRED EMBODIMENTS

Figure 1:
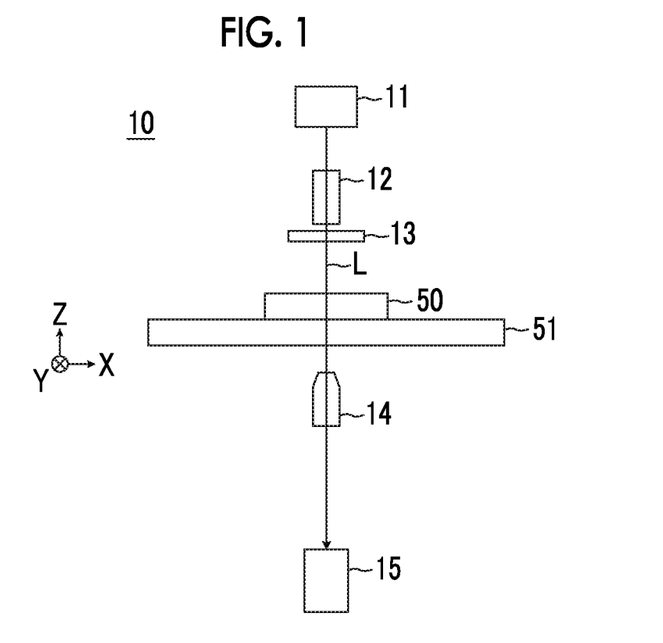
FIG. 1 is a diagram illustrating a schematic configuration of a microscope imaging system using an embodiment of an imaging device of the present invention.

Hereinafter, a microscope imaging system using an embodiment of an imaging device, an imaging method and an imaging device control program of the present invention will be described in detail with reference to the accompanying drawings. FIG. 1 is a block diagram illustrating a schematic configuration of a microscope device 10 in a microscope imaging system of the present embodiment.

The microscope device 10 is configured to capture a phase difference image of a cultured cell which is an observation target. Specifically, as shown in FIG. 1, the microscope device 10 comprises a white light source 11 that emits white light, a capacitor lens 12, a slit plate 13, an imaging optical system 14, and an imaging unit 15.

The white light source 11 is a strobe light source that intermittently emits white light. The white light source 11 emits white light intermittently in accordance with the shutter timing of the imaging unit 15, and a single light-emission period is approximately 2 μs. Meanwhile, the light-emission timing of the white light source 11 and the shutter timing of the imaging unit 15 will be described later. In addition, in the present embodiment, the white light source 11 is equivalent to a light source of the present invention.

The slit plate 13 is provided with a ring-shaped slit for transmitting white light with respect to a light shielding plate that shields white light emitted from the white light source 11, and ring-shaped illumination light L is formed by the white light passing through the slit.

Figure 2:
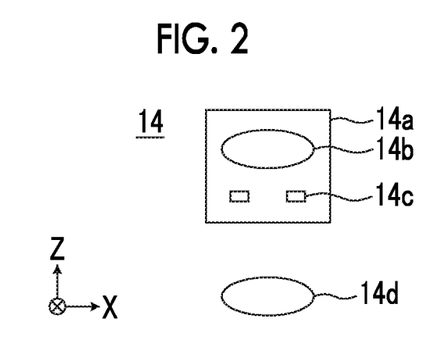
FIG. 2 is a schematic diagram illustrating a configuration of an imaging optical system.

The imaging optical system 14 forms a phase difference image of an observation target formed by the irradiation of an observation target with the ring-shaped illumination light L on an imaging element of the imaging unit 15. FIG. 2 is a diagram illustrating a detailed configuration of the imaging optical system 14. As shown in FIG. 2, the imaging optical system 14 comprises a phase difference lens 14a and an imaging lens 14d. The phase difference lens 14a comprises an objective lens 14b and a phase plate 14c. The phase plate 14c is configured to form a phase ring on a plate transparent to the wavelength of the illumination light L. Meanwhile, the size of the slit of the above-described slit plate 13 has a relationship conjugate to the phase ring of the phase plate 14c.

The phase ring is configured such that a phase film having the phase of incident light shifted by ¼ wavelength and a dimming filter that dims the incident light are formed in a ring shape. Direct light which is incident on the phase ring has its phase shifted by ¼ wavelength by passing through the phase ring, and has its brightness weakened. On the other hand, most of diffracted light diffracted by an observation target passes through the transparent plate of the phase plate 14c, and the phase and brightness thereof do not change.

Meanwhile, a configuration may be used in which the magnification of the phase difference lens 14a can be changed. Specifically, the phase difference lens 14a or the imaging optical system 14 having different magnifications may be configured to be replaceable. The replacement of the phase difference lens 14a or the imaging optical system 14 may be configured to be automatically performed, and may be configured to be manually performed by a user.

The imaging lens 14d is configured such that a phase difference image having passed through the phase difference lens 14a is incident thereon, and the image is formed on the imaging unit 15.

In addition, the imaging optical system 14 forms a phase difference image for each observation region, obtained by dividing the range of a culture vessel 50, on the imaging unit 15.

The imaging unit 15 is configured to receive the phase difference image for each observation region formed by the imaging optical system 14, and to output a signal of the phase difference image for each observation region. The imaging unit 15 comprises an imaging element such as a charge-coupled device (CCD) image sensor or a complementary metal-oxide semiconductor (CMOS) image sensor. As the imaging element, an imaging element provided with a color filter of red green blue (RGB) may be used, and an imaging element of monochrome may be used.

In addition, the imaging element is configured to comprise an electronic shutter, and to capture an image of an observation target at a shutter timing which is set in advance. The shutter timing is set in advance on the basis of the movement speed of a stage 51 and the width of each observation region in an X direction.

The stage 51 is provided between the slit plate 13 and the imaging optical system 14. The culture vessel 50 having a cell which is an observation target received therein is installed on the stage 51.

As the culture vessel 50, a petri dish, a dish, a well plate, or the like can be used. In addition, examples of cells received in the culture vessel 50 include multipotent stem cells such as an iPS cell and an ES cell, cells of a nerve, a skin, a heart muscle and a liver differentiated and induced from a stem cell, cells of a skin, a retina, a heart muscle, a blood corpuscle, a nerve and an internal organ extracted from a human body, and the like.

The stage 51 is configured to be moved in an X direction and a Y direction orthogonal to each other by a horizontal driving unit 16 (see FIG. 4) described later. The X direction and the Y direction are directions orthogonal to a Z direction, and directions orthogonal to each other within a horizontal plane. In the present embodiment, the X direction is set to a main scanning direction, and the Y direction is set to a sub-scanning direction.

Figure 3:
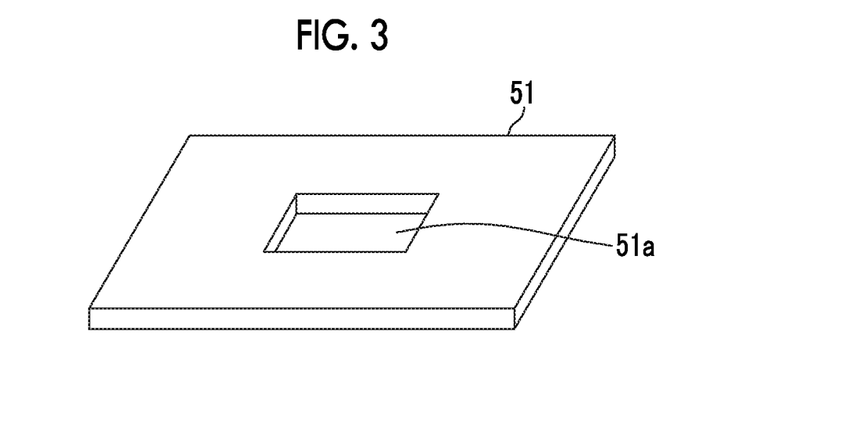
FIG. 3 is a perspective view illustrating a configuration of a stage.

FIG. 3 is a diagram illustrating an example of the stage 51. A rectangular opening 51a is formed at the center of the stage 51. The culture vessel 50 is installed on a member in which this opening 51a is formed, and is configured such that a phase difference image of a cell within the culture vessel 50 passes through the opening 51a.

Figure 4:
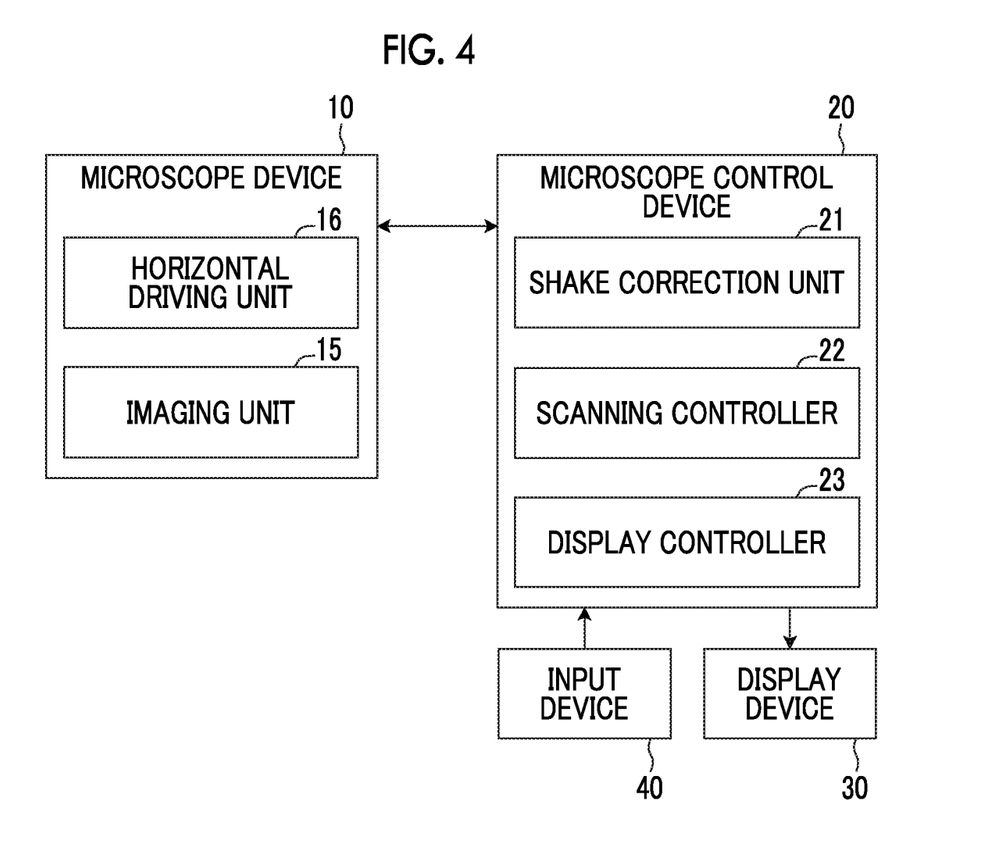
FIG. 4 is a block diagram illustrating a schematic configuration of the microscope imaging system using an embodiment of the imaging device of the present invention.

Next, a description will be given of the configuration of a microscope control device 20 that controls the microscope device 10 and performs shake correction on a phase difference image signal which is output from the imaging unit 15 of the microscope device 10. FIG. 4 is a block diagram illustrating a configuration of a microscope imaging system of the present embodiment. Meanwhile, regarding the microscope device 10, a block diagram of some configurations controlled by each unit of the microscope control device 20 is shown.

The microscope control device 20 is configured to control the entirety of the microscope device 10, and to particularly comprise a scanning controller 22 and a display controller 23. In addition, the microscope control device 20 is configured to comprise a shake correction unit 21 that performs shake correction on the phase difference image signal which is output from the imaging unit 15. Meanwhile, the shake correction of the present embodiment is a process of correcting a shake generated in a phase difference image signal due to the movement of the stage 51. The shake correction will be described later.

The microscope control device 20 is constituted by a computer including a central processing unit, a semiconductor memory, a hard disk, and the like, and is configured such that an embodiment of an imaging device control program of the present invention is installed on a hard disk. This imaging device control program is executed by the central processing unit, and thus the shake correction unit 21, the scanning controller 22 and the display controller 23 shown in FIG. 4 perform their functions.

The scanning controller 22 drives and controls the horizontal driving unit 16, to thereby move the stage 51 in the X direction and the Y direction. The horizontal driving unit 16 is constituted by an actuator having a piezoelectric element or the like.

Figure 5:
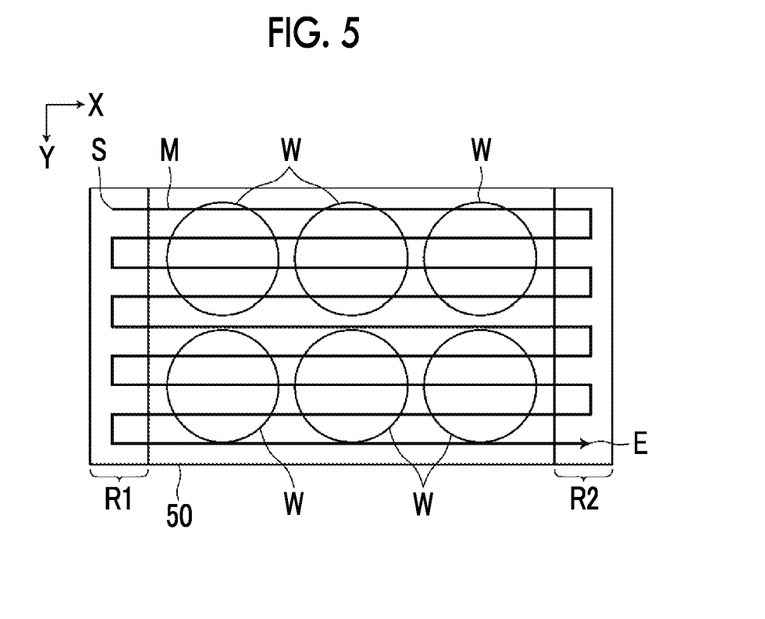
FIG. 5 is a diagram illustrating a scanning position of an observation region within a culture vessel.

In the present embodiment, the stage 51 is moved in the X direction and the Y direction by control performed by the scanning controller 22, and the observation region of the imaging optical system 14 is scanned in a two-dimensional shape within the culture vessel 50, to thereby acquire a phase difference image signal of each observation region. FIG. 5 is a diagram illustrating a scanning position of an observation region within the culture vessel 50 using a solid line M. Meanwhile, in the present embodiment, a well plate having six wells W is used as the culture vessel 50.

As shown in FIG. 5, the observation region of the imaging optical system 14 moves along the solid line M from a scanning start point S to a scanning end point E. That is, the observation region is scanned in a forward direction (rightward direction in FIG. 5) which is the X direction, and then moves in the Y direction (downward direction in FIG. 5). Thereafter, the observation region is scanned in a negative direction (leftward direction in FIG. 5) which is the X direction. Next, the observation region moves in the Y direction again, and is scanned in the forward direction which is the X direction again. In this manner, the observation region is scanned in a two-dimensional shape within the culture vessel 50 by repeatedly performing forward and backward movement in the X direction and movement in the Y direction.

Meanwhile, as described above, in a case where the observation region is scanned within the range of the culture vessel 50 by moving the stage 51 in the X direction, it is preferable that the movement speed of the observation region in the range of the culture vessel 50 is constant. Therefore, the stage 51 is required to be accelerated until reaching a constant speed at the time of the start of the movement of the stage 51 in the X direction, and the stage 51 is required to be decelerated from a constant speed and be stopped at the time of the end of the movement of the stage 51 in the X direction.

In addition, in a case where the movement speed of the stage 51 in the X direction is set to a constant speed, the movement speed can be rapidly controlled to a constant speed in a state where an acceleration region is almost not present. However, in a case where such control is performed, the solution level of a culture solution or the like received in the culture vessel 50 together with a cell is shaken, and thus there is the possibility of a deterioration in the image quality of a phase difference image being caused. In addition, there is the possibility of the same problem occurring even in a case where the stage 51 is stopped.

Consequently, in the present embodiment, a range R1 and a range R2 shown in FIG. 5 are set to acceleration and deceleration regions of the movement of the stage 51 in the X direction. In this manner, acceleration and deceleration regions are set in both side of the range of the culture vessel 50 in the X direction, and thus it is possible to scan an observation region at a constant speed in the range of the culture vessel 50, and to suppress a shake of the solution level of a culture solution.

As described above, the observation region of the imaging optical system 14 is scanned in the X direction by the movement of the stage 51 in the X direction, and a phase difference image signal of each observation region is acquired. However, the phase difference image signal of each observation region is acquired by controlling the light emission of the white light source 11 and the shutter timing of the imaging unit 15 together with the scanning of the observation region.

Figure 6:
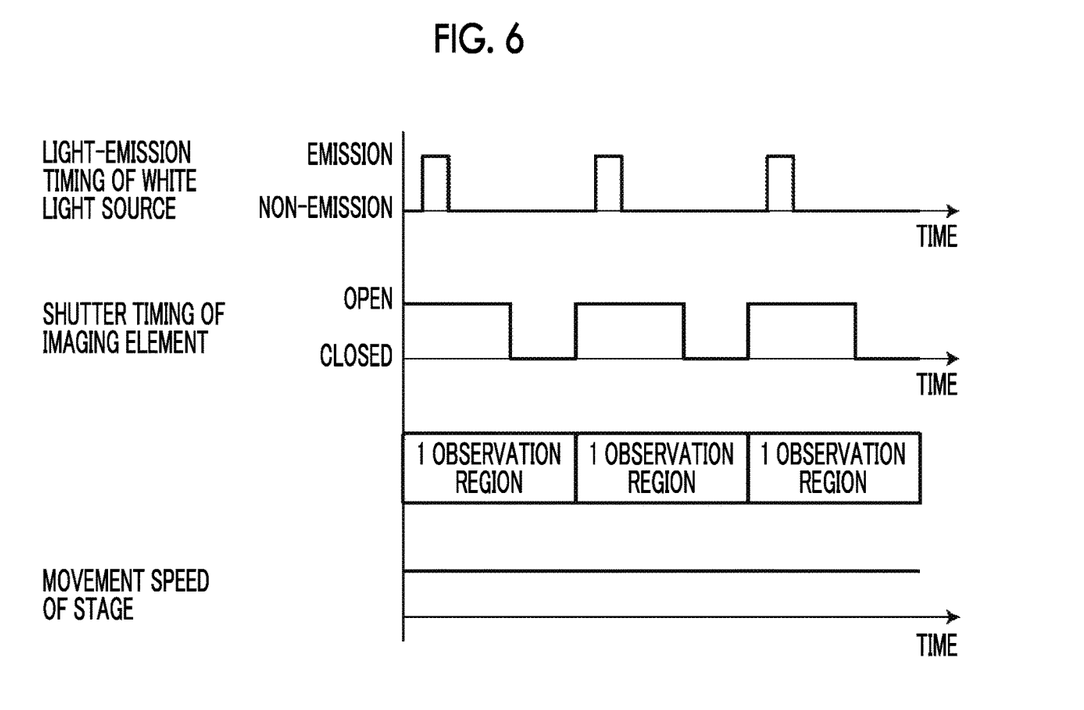
FIG. 6 is a diagram illustrating a light-emission timing of a white light source and a shutter timing of an imaging element which correspond to each observation region within the culture vessel.

FIG. 6 is a diagram illustrating a light-emission timing of the white light source 11 and a shutter timing of the imaging unit 15 which correspond to each observation region within the culture vessel 50. Meanwhile, the movement speed of the stage 51 is constant as shown in FIG. 6. The electronic shutter of the imaging unit 15 is opened only at an exposure time which is set in advance for each observation region. The exposure time may be set within a time for which the stage 51 moves by the width of one observation region in the X direction.

Here, in a case where the phase difference image signal of each observation region is acquired while moving the stage 51, the stage 51 moves without stopping even during the above-described exposure time, that is, an observation target moves, and thus a shake caused by this movement occurs in the phase difference image signal. In order to suppress this shake, it is also considered to shorten the exposure time, but there is a limitation on the operation speed of the electronic shutter of the imaging unit 15.

Consequently, in the present embodiment, a shake is suppressed by shortening the irradiation time of an observation target with the illumination light L rather than shortening the exposure time. Specifically, as described above, white light is emitted intermittently using the white light source 11 as a strobe light source, to thereby control the irradiation time of the illumination light L. In the present embodiment, as shown in FIG. 6, the white light source 11 is caused to emit light during the exposure time of each observation region. It is preferable that the light emission time of the white light source 11 is determined on the basis of the movement speed of the stage, the pixel size of an imaging element included in the imaging unit 15, the magnification of the imaging optical system 14, and the like, and is determined so that light of a range equivalent to one pixel of an observation target is incident on one pixel of an imaging element.

However, a voltage which is applied to the white light source 11 which is a strobe light source is high, and has a property of the strobe light source itself, whereby the light-emission characteristics of white light emitted from the white light source 11 are not necessarily able to be set to light-emission characteristics as shown in FIG. 6.

Figure 7:
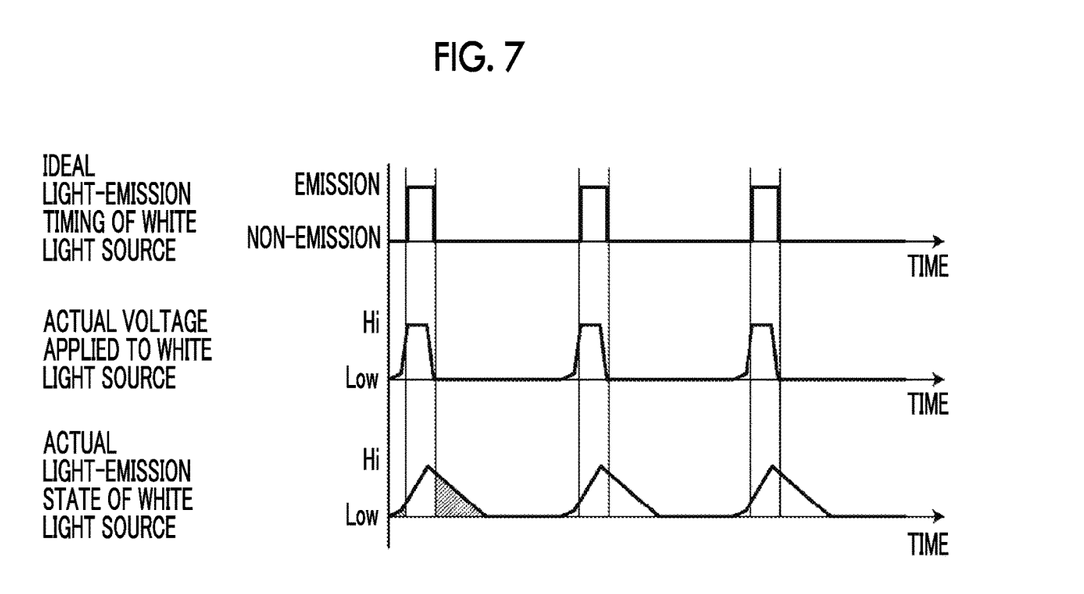
FIG. 7 is a diagram illustrating an ideal light-emission timing of the white light source, an actual timing of application of a voltage to the white light source, and an actual light-emission state of the white light source based on the application of a voltage.

FIG. 7 is a diagram illustrating an ideal light-emission timing of the white light source 11 shown in FIG. 6, an actual timing of application of a voltage to the white light source 11, and an actual light-emission state of the white light source 11 based on the application of a voltage.

In order to emit white light from the white light source 11 as an ideal light-emission timing, as shown in FIG. 7, the timing of the application of a voltage to the white light source 11 is required to be set to a timing earlier than the ideal light-emission timing of the white light. However, in a case where the timing of the application of a voltage is made earlier in this manner, in reality, the white light source 11 emits light earlier than the ideal light-emission timing. In addition, in order to stop the light emission of the white light source 11 so as to be set to an ideal light-emission period, it is necessary to stop the application of a voltage to the white light source 11 before the elapse of the ideal light-emission period. However, even in a case where the application of a voltage is caused to be stopped in this manner, light emission is not able to be rapidly stopped due to the property of the white light source 11 itself. In reality, as shown in FIG. 7, the light emission of the white light source 11 gradually attenuates, and thus becomes longer than the ideal light-emission period of the white light.

Figure 8:
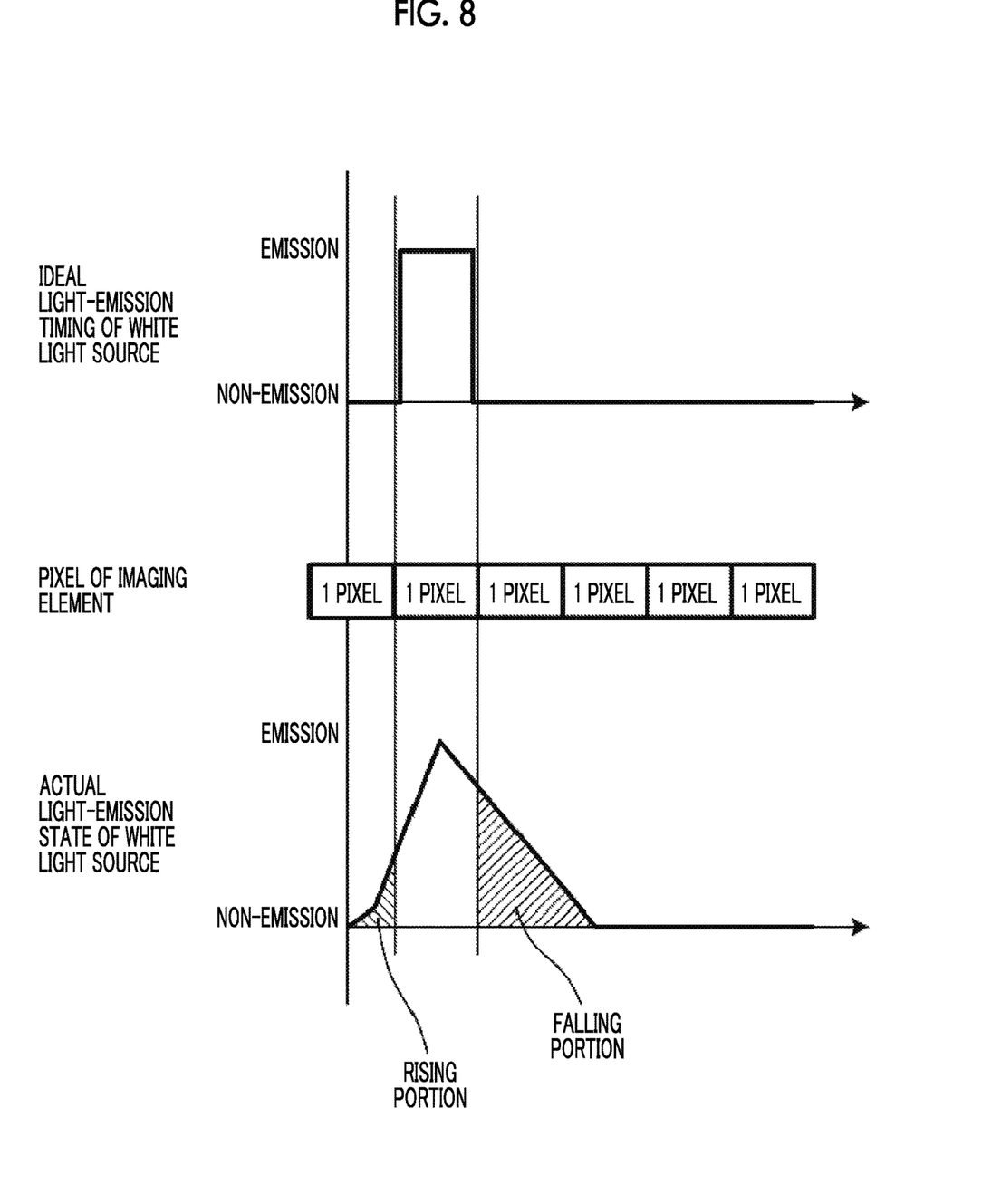
FIG. 8 is a diagram illustrating occurrence of a shake caused by the light-emission state of the white light source.

Therefore, in light-emission characteristics as shown in FIG. 7, the light-emission characteristics of the white light source 11 cause the occurrence of a shake in the phase difference image signal due to the light emission of portions shown using diagonal lines and the movement of the stage 51. That is, as shown in FIG. 8, in a case of the ideal light-emission timing, only one pixel's worth of light of a phase difference image of an observation target is incident on one pixel of an imaging element, and thus a shake does not occur. However, in reality, since the light-emission state of the white light source 11 has a rising portion and a falling portion as shown in FIG. 8, light emission in these portions is received by one pixel of an imaging element, whereby a shake occurs in the phase difference image signal.

The shake correction unit 21 corrects a shake caused by the movement of the stage 51 and the light-emission characteristics of the white light source 11 as described above. The shake correction unit 21 uses a correction filter which is set in advance to perform shake correction on the phase difference image signal of each observation region which is output from the imaging unit 15.

Here, light amount data in units of times where the actual light-emission state (light-emission characteristics) of the white light source 11 shown in FIG. 8 is detected by the imaging optical system 14 is converted into light amount data in units of pixels in consideration of the speed of the stage 51, the resolution of the imaging unit 15, a time which is taken until the light amount of the white light source 11 becomes maximum from the application of a voltage, and the like, and the normalization of the light amount data after the conversion by a pixel having a maximum light amount is obtained as a point spread function (PSF), thereby allowing this point spread function to be used as a correction filter. In reality, Fourier transformation is performed on the PSF, and an arithmetic operation equivalent to the inverse function is multiplied by a frequency-converted phase difference image signal, thereby allowing shake correction to be performed. Specifically, for example, a Wiener filter is calculated on the basis of the above PSF, and this calculated filter is multiplied by the frequency-converted phase difference image signal, thereby allowing shake correction to be performed.

In addition, in the present embodiment, as described above, the stage 51 is moved forward and backward in the X direction, that is, an observation target is moved forward and backward in the X direction. Therefore, a PSF in a case where the stage 51 moves in one direction of the X direction and a PSF in a case where the stage moves in the other reverse direction are different from each other.

Therefore, the shake correction unit 21 switches a correction filter in accordance with the movement direction of the stage 51. Specifically, a PSF in a case where the stage 51 moves in one direction and a PSF in a case where the stage moves in the other direction are formed in a reversed shape in the X direction. Therefore, regarding the correction filter, a correction filter using a PSF in a case where the stage 51 moves in any one direction is set in advance, and this correction filter is switched by reversion in the X direction in accordance with the movement direction of the stage 51.

Figure 9:
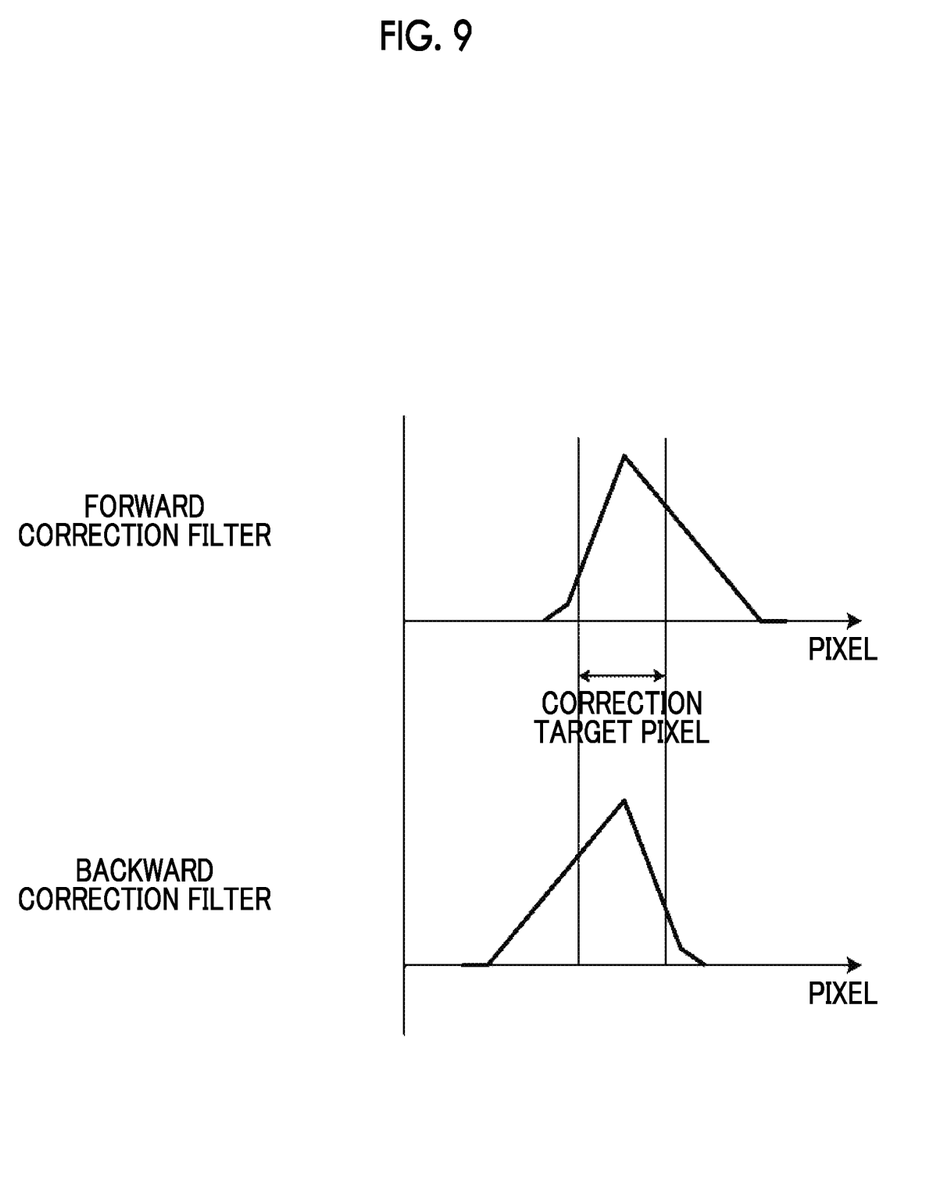
FIG. 9 is a diagram illustrating an example of a correction filter in a case where a strobe light source is used.

FIG. 9 is a diagram illustrating an example of a forward correction filter which is used in a phase image signal acquired in a case where the stage 51 moves forward and a backward correction filter which is used in a phase difference image signal acquired in a case where the stage 51 moves backward. The forward correction filter and the backward correction filter are formed in an asymmetric shape centering on the pixel position of a correction target in a direction corresponding to the main scanning direction.

In the present embodiment, the forward correction filter is set in advance, and is used as the backward correction filter by reversing this filter. However, without being limited thereto, the forward correction filter and the backward correction filter may be separately set, and these filters may be switched and used in accordance with the movement direction of the stage 51.

In a case where the forward correction filter and the backward correction filter are separately provided in this manner, for example, the stage 51 may move forward and may move backward. In a case where the shake amounts of movement to the sub-scanning direction are different from each other, or the like, it is possible to reflect a difference between these shake amounts of movement on the forward correction filter and the backward correction filter, and to thereby improve the accuracy of shake correction.

In addition, whenever a phase difference image signal for each observation region is acquired, the shake correction unit 21 may perform shake correction on the phase difference image signal, and may perform shake correction after phase difference image signals of all observation regions are acquired. Specifically, whenever a phase difference image signal for each observation region is input, the shake correction unit 21 acquires information of the movement direction of the stage 51 at that point in time, and stores the phase difference image signal and the information of the movement direction of the stage 51 in association with each other. After the phase difference image signals of all observation regions are input, the shake correction unit 21 may refer to the information of the movement direction of the stage 51 associated with the phase difference image signal of each observation region, and may perform shake correction on the phase difference image signal of each observation region using a correction filter according to the movement direction of the stage 51.

Next, referring back to FIG. 4, the display controller 23 generates one synthetic phase difference image signal by bonding the phase difference image signals of the respective observation regions captured by the microscope device 10, and causes a display device 30 to display the synthetic phase difference image signal.

The display device 30 is configured to display a synthetic phase difference image on the basis of the synthetic phase difference image signal generated by the display controller 23 as described above, and to include, for example, a liquid crystal display or the like. In addition, the display device 30 may be constituted by a touch panel, and may serve as an input device 40.

The input device 40 includes a mouse, a keyboard or the like, and accepts a user's various setting inputs. The input device 40 of the present embodiment accepts setting inputs such as, for example, an instruction for change of the magnification of the phase difference lens 14*a*, an instruction for change of the movement speed of the stage 51, and an instruction for change of the light amount of the white light source 11.

Figure 10:
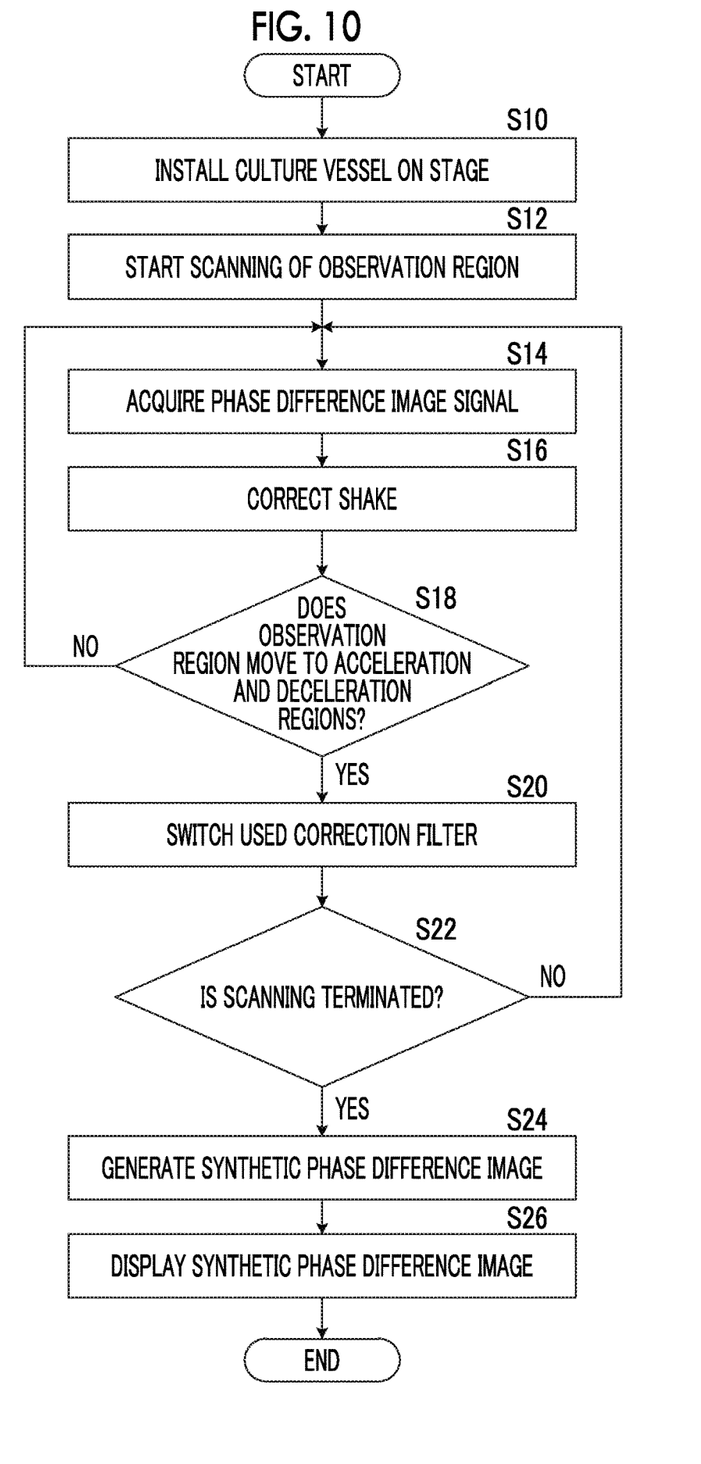
FIG. 10 is a flow diagram illustrating an action of the microscope imaging system using an embodiment of the imaging device of the present invention.

Next, the action of the microscope imaging system of the present embodiment will be described with reference to a flow diagram shown in FIG. 10.

First, the culture vessel 50 having a cell which is an observation target received therein is installed on the stage 51 (S10). Next, while the stage 51 moves, the observation region of the imaging optical system 14 is set at the position of the scanning start point S shown in FIG. 5, and scanning of the observation region is started (S12).

A phase difference image signal for each observation region is output from the imaging unit 15, and is acquired by the shake correction unit 21. In a case where the stage 51 moves forward, the shake correction unit 21 performs shake correction on the phase difference image signal for each input observation region using the forward correction filter (S16, NO in S18). In a case where the observation region moves to the acceleration and deceleration regions, and the movement of the stage 51 is switched to movement in a backward direction (YES in S18), the shake correction unit 21 reverses the forward correction filter (S20), and performs shake correction on the phase difference image signal for each observation region using this filter as the backward correction filter.

Processes of S14 to S20 are repeated until all the scannings of the observation region are terminated (NO in S22). All the scannings are terminated at a point in time when the observation region reaches the position of the scanning end point E shown in FIG. 5 (YES in S22).

After all the scannings are terminated, the display controller 23 generates a synthetic phase difference image signal by bonding the phase difference image signals of the respective observation regions (S24), and causes the display device 30 to display a synthetic phase difference image on the basis of the generated synthetic phase difference image signal (S26).

According to the microscope imaging system of the embodiment, since shake correction for correcting a shake caused by the movement of the stage 51 is performed on the phase difference image signal of each observation position, and a correction filter used in shake correction is switched in accordance with the movement direction of the stage 51 in the main scanning direction, it is possible to perform high-speed image capture of an observation target such as a cell, and to correct a shake caused by the movement of a stage or the like appropriately and simply.

Figure 11:
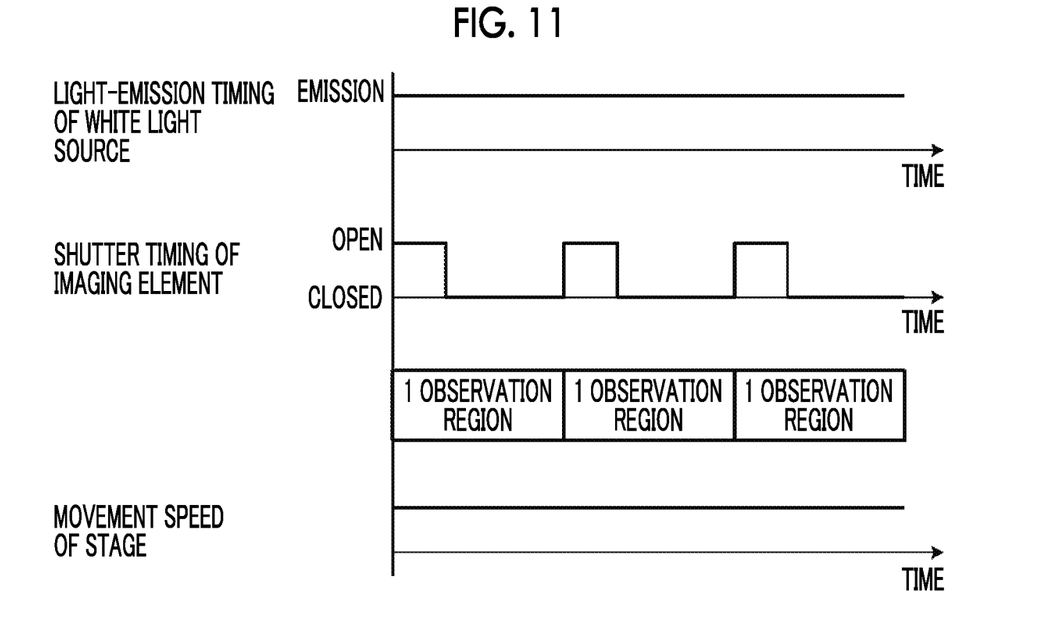

Meanwhile, in the microscope imaging system of the embodiment, a strobe light source is used as the white light source 11, and white light is intermittently emitted to an observation target, but without being limited thereto, the white light may be continuously turned on as shown in FIG. 11. In this case, in order to suppress a shake caused by the stage 51, the exposure time of the imaging unit 15 is set to be 30 μs shorter than in the embodiment, and shake correction using a correction filter is further performed as is the case with the embodiment.

Figure 12:
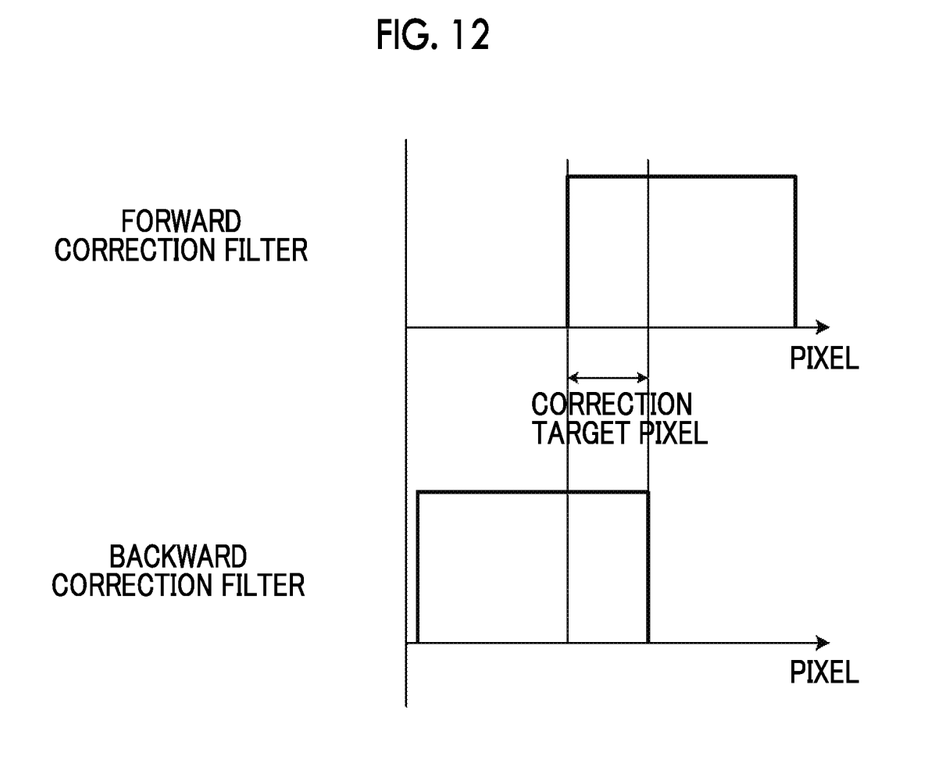

Even in a case where the white light is continuously turned on, the light-emission characteristics of the white light are set to a PSF as is the case with the embodiment, and a correction filter is calculated on the basis thereof. FIG. 12 shows an example of a forward correction filter and a backward correction filter in a case where the white light is continuously turned on. The forward correction filter and the backward correction filter in a case where the white light is continuously turned on are also formed in an asymmetric shape centering on the pixel position of a correction target in a direction corresponding to the main scanning direction.

Even in a case where the white light is continuously turned on, as is the case with the embodiment, the forward correction filter may be set in advance and be used as the backward correction filter by reversing this filter. The forward correction filter and the backward correction filter may be separately set, and these filters may be switched and used in accordance with the movement direction of the stage 51.

In addition, in the microscope imaging system of the embodiment, a correction filter according to imaging conditions may be set, and the correction filter may be switched and used in accordance with the imaging conditions. Examples of the imaging conditions include the movement speed of the stage 51, the light amount of the white light source 11, and the like.

For example, a correction filter for each movement speed may be stored in advance in the shake correction unit 21 by changing the movement speed of the stage 51, and the correction filter may be switched in accordance with a user's instruction for change of the movement speed of the stage 51. In addition, a correction filter for each light amount may be stored in advance in the shake correction unit 21 by changing the light amount of the white light source 11, and the correction filter may be switched in accordance with a user's instruction for change of the light amount.

Meanwhile, regarding the change of the movement speed of the stage 51 and the change of the light amount of the white light source 11, for example, the display device 30 may be caused to display a screen for accepting an input of the change of the movement speed and the light amount, and a user may be caused to set and input the movement speed and the light amount after the change on the screen using the input device 40.

Figure 13:
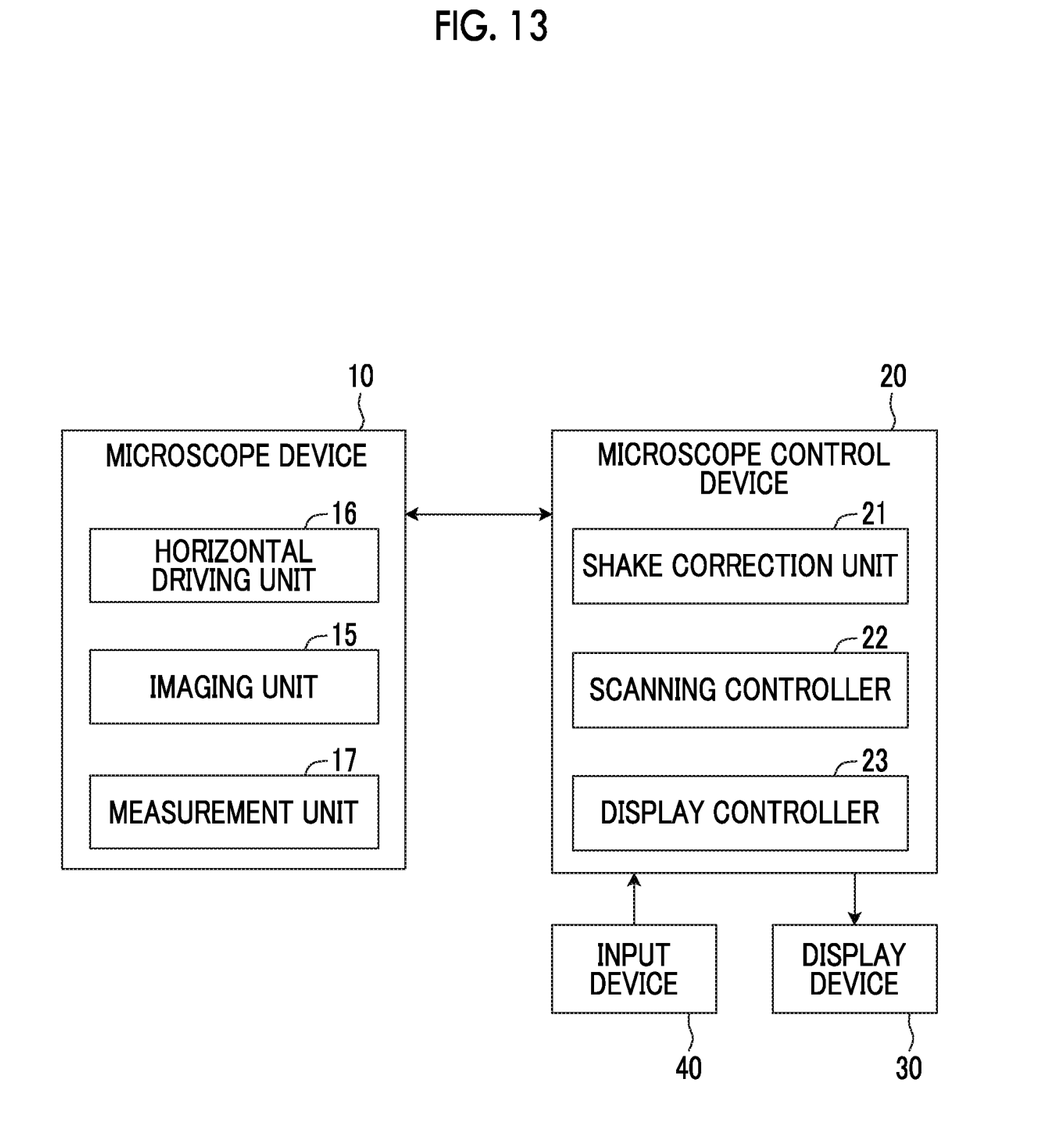
FIG. 13 is a diagram illustrating a schematic configuration of a microscope imaging system using another embodiment of the imaging device of the present invention.

In addition, in the microscope imaging system of the embodiment, as shown in FIG. 13, a measurement unit 17 that measures the light-emission characteristics of illumination light emitted from the white light source 11 may be provided, and the shake correction unit 21 may calculate and update a correction filter again on the basis of the light-emission characteristics measured by the measurement unit 17. The white light source 11 degrades over time along with the elapse of time, and the light-emission characteristics thereof also change. Therefore, as described above, the measurement unit 17 that measures light-emission characteristics is provided, and a correction filter is periodically updated, whereby it is possible to maintain the accuracy of shake correction.

Specifically, the measurement unit 17 measures rise and/or fall of the white light source 11. In a case where the rise and/or the fall measured by the measurement unit 17 changes more greatly than in previously measured results, the shake correction unit 21 may calculate a correction filter again on the basis of the measurement results. The measurement unit 17 may measure the rise and/or fall of light emission by detecting light emitted from the white light source 11, and may indirectly measure the rise and/or fall of light emission by measuring a change in the voltage of the white light source 11.

Update of a correction filter is performed by, for example, a user's update instruction input. Regarding the update instruction input of the correction filter, for example, the display device 30 may be caused to display a button or the like for accepting an input of correction filter update, and a user may be caused to press the button using the input device 40. A change in the light amount of the white light source 11 is measured by the measurement unit 17 in accordance with a user's update instruction of a correction filter. The measured light amount change is converted into a PSF in accordance with the movement speed of the stage 51, and thus update of the correction filter is performed. Meanwhile, for example, in a case where the speeds of the stage 51 are different from each other in forward and backward movements, update of the correction filter is performed in consideration of a difference between the speeds.

In addition, in the microscope imaging system of the embodiment, the intensity of shake correction in the shake correction unit 21 may be able to be changed. In a case where shake correction is performed as described above, a shake of a phase difference image caused by the movement of the stage 51 is suppressed. However, for example, in a case where noise is present within the phase difference image, the noise may be highlighted due to the shake correction. Therefore, in consideration of a case where noise is present within a phase difference image, or the like, it is preferable that a user can change the intensity of shake correction. Meanwhile, regarding a change in the intensity of shake correction, a correction filter may be changed on the basis of a rule which is set in advance.

In addition, regarding a change in the intensity of shake correction, for example, the display device 30 may be caused to display a screen for accepting an input of a change in the intensity of shake correction, and a user may be caused to set and input the intensity of shake correction after the change on the screen using the input device 40. Meanwhile, in this case, the screen for accepting an input of a change in the intensity of shake correction and the input device 40 are equivalent to a shake correction intensity change acceptance unit of the present invention.

Meanwhile, in the embodiment, an observation region is scanned by moving the stage 51. However, without being limited thereto, the observation region may be scanned by moving the imaging optical system 14 and other components relating to capture of a phase difference image with the stage 51 fixed, and the observation region may be scanned by moving both the stage 51, and the imaging optical system 14 and other components relating to capture of a phase difference image.

In addition, the embodiment has the present invention applied to a phase difference microscope, but the present invention may be applied to other microscopes such as a differential interference microscope and a bright field microscope without being limited to the phase difference microscope.

EXPLANATION OF REFERENCES

10: microscope device
11: white light source
12: capacitor lens
13: slit plate
14: imaging optical system
14a: phase difference lens
14b: objective lens
14c: phase plate
14d: imaging lens
15: imaging unit
16: horizontal driving unit
17: measurement unit
20: microscope control device
21: shake correction unit
22: scanning controller
23: display controller
30: display device
40: input device
50: culture vessel
51: stage
51a: opening
L: illumination light
M: solid line indicating position of observation region
R1: range of acceleration and deceleration region
R2: range of acceleration and deceleration region
S: scanning start point
E: scanning end point
W: well

What is claimed is:

1. An imaging device comprising:
a stage on which a vessel having an observation target received therein is installed;
an imaging optical system that forms an image of the observation target within the vessel;
an actuator that moves at least one of the stage or the imaging optical system in a main scanning direction and a sub-scanning direction orthogonal to the main scanning direction, and moves the at least one of the stage or the imaging optical system forward and backward in the main scanning direction;
an imaging element that receives the image formed by the imaging optical system, and outputs an image signal of the observation target; and
a central processing unit that performs shake correction for correcting a shake caused by movement of at least one of the stage or the imaging optical system on the image signal which is output from the imaging element,
wherein the central processing unit switches a correction filter used in the shake correction in accordance with a movement direction of at least one of the stage or the imaging optical system in the main scanning direction,
wherein the correction filter is asymmetric about a pixel position of a correction target in a direction corresponding to the main scanning direction.

2. The imaging device according to claim 1, further comprising a light source that intermittently emits illumination light to the observation target in accordance with a shutter timing of the imaging element,
wherein the central processing unit performs the shake correction using the correction filter according to light-emission characteristics of the illumination light.

3. The imaging device according to claim 2, further comprising a measurement unit that measures the light-emission characteristics of the illumination light emitted from the light source,
wherein the central processing unit updates the correction filter on the basis of the light-emission characteristics measured by the measurement unit.

4. The imaging device according to claim 1,
wherein the central processing unit includes a forward correction filter and a backward correction filter in the main scanning direction, and switches the forward correction filter and the backward correction filter in accordance with the movement direction of at least one of the stage or the imaging optical system in the main scanning direction.

5. The imaging device according to claim 2,
wherein the central processing unit includes a forward correction filter and a backward correction filter in the main scanning direction, and switches the forward correction filter and the backward correction filter in accordance with the movement direction of at least one of the stage or the imaging optical system in the main scanning direction.

6. The imaging device according to claim 3, wherein the central processing unit includes a forward correction filter and a backward correction filter in the main scanning direction, and switches the forward correction filter and the backward correction filter in accordance with the movement direction of at least one of the stage or the imaging optical system in the main scanning direction.

7. The imaging device according to claim 1, wherein the central processing unit uses the correction filter by reversing the correction filter in a direction corresponding to the main scanning direction, in accordance with the movement direction of at least one of the stage or the imaging optical system in the main scanning direction.

8. The imaging device according to claim 1, wherein the central processing unit includes the correction filter according to imaging conditions.

9. The imaging device according to claim 8, wherein the central processing unit includes the correction filter according to a movement speed of at least one of the stage or the imaging optical system in the main scanning direction.

10. The imaging device according to claim 1, wherein the imaging optical system forms an image for each observation region obtained by dividing a range including the observation target, the imaging element outputs an image signal for each of the observation regions, and the central processing unit acquires image signals of all observation regions which are set in advance, and then performs the shake correction on the image signal for each of the observation regions using a correction filter according to the movement direction, on the basis of information of the movement direction of at least one of the stage or the imaging optical system in the main scanning direction at a point in time when the image signal for each of the observation regions is captured.

11. The imaging device according to claim 1, wherein the central processing correction unit accepts a change in intensity of the shake correction and performs the shake correction on the basis of the changed intensity.

12. An imaging method comprising:
moving at least one of a stage on which a vessel having an observation target received therein is installed or an imaging optical system that forms an image of the observation target within the vessel in a main scanning direction and a sub-scanning direction orthogonal to the main scanning direction, and moving the at least one of the stage or the imaging optical system forward and backward in the main scanning direction; and
acquiring an image signal of the observation target by an imaging element receiving the image formed by the imaging optical system,
wherein shake correction for correcting a shake caused by movement of at least one of the stage or the imaging optical system is performed on the image signal which is output from the imaging element, and a correction filter used in the shake correction is switched in accordance with a movement direction of the at least one in the main scanning direction,
wherein the correction filter is asymmetric about a pixel position of a correction target in a direction corresponding to the main scanning direction.

13. A non-transitory computer readable recording medium storing an imaging device control program causing a computer to execute:
a procedure of moving at least one of a stage on which a vessel having an observation target received therein is installed or an imaging optical system that forms an image of the observation target within the vessel in a main scanning direction and a sub-scanning direction orthogonal to the main scanning direction, and moving the at least one of the stage or the imaging optical system forward and backward in the main scanning direction; and
a procedure of acquiring an image signal of the observation target by an imaging element receiving the image formed by the imaging optical system,
wherein the computer is caused to further execute a procedure of performing shake correction for correcting a shake caused by movement of at least one of the stage or the imaging optical system on the image signal which is output from the imaging element, and switching a correction filter used in the shake correction in accordance with a movement direction of the at least one in the main scanning direction,
wherein the correction filter is asymmetric about a pixel position of a correction target in a direction corresponding to the main scanning direction.

* * * * *